US005981904A

United States Patent [19]

Gordon

[11] Patent Number: 5,981,904

[45] Date of Patent: Nov. 9, 1999

[54] TANDEM CATHODIC CLEANING DEVICE FOR WIRE

[75] Inventor: Stephen S. Gordon, Canton, Ohio

[73] Assignee: McDermott Technology, Inc., New Orleans, La.

[21] Appl. No.: 09/031,650

[22] Filed: Feb. 27, 1998

Related U.S. Application Data

[63] Continuation-in-part of application No. 08/706,124, Aug. 30, 1996.

[51] Int. Cl.[6] .................. B23K 9/04

[52] U.S. Cl. .................. 219/123; 219/136; 219/155

[58] Field of Search .................. 219/123, 136, 219/137 R, 155

[56] References Cited

U.S. PATENT DOCUMENTS

| | | | |
|---|---|---|---|
| Re. 34,806 | 12/1994 | Cann | 427/446 |
| 1,803,691 | 5/1931 | Brockway . | |
| 3,386,909 | 6/1968 | Hough | 204/312 |
| 3,522,162 | 7/1970 | Davies | 204/180 |
| 3,658,673 | 4/1972 | Kugler et al. | 204/164 |
| 4,935,115 | 6/1990 | Chambaere et al. | 201/192.32 |

*Primary Examiner*—Clifford C. Shaw

*Attorney, Agent, or Firm*—R. J. Edwards; Eric Marich

[57] ABSTRACT

A wire cleaner having a chamber and containing an arc ring for passing a wire therethrough, such that when the wire and arc ring are provided with opposite electrical potentials, an electric arc discharge occurs from the wire to the arc ring which carries off impurities from the surface of the wire. An inert gas is used to purge the chamber to prevent oxidation of the wire during and following the discharge from the wire. A pair of annular permanent magnets are positioned around the wire on each side of the arc ring to produce a magnetic field parallel to the wire which interacts with the electrical arc discharge and causes the arc to rotate around the circumferences of the wire and arc ring, thereby cleaning the entire wire. A second embodiment is provided in which the pair of permanent annular magnets is replaced by a variable strength electromagnet surrounding the arc ring and wire path. Other embodiments employ a pair of arc rings to carry the electric current so that two arcs are created in tandem. Alternating current (AC) with a superimposed high frequency (HF) current can be used to stabilize the arcs, which then rapidly alternate between the wire and each of the two arc rings. The pair of arc rings share a more powerful permanent magnet between them, with second and third permanent magnets located outboard of each arc ring. An internal wire guide can be used to prevent the wire from contacting the arc rings.

8 Claims, 4 Drawing Sheets

TANDEM CATHODIC CLEANING DEVICE FOR WIRE

CROSS-REFERENCE TO RELATED APPLICATION

This is a continuation-in-part application to U.S. patent application Ser. No. 08/706,124 filed Aug. 30, 1996, now pending, entitled DEVICE FOR CATHODIC CLEANING OF WIRE. This parent application, Ser. No. 08/706,124, is incorporated here by reference.

FIELD AND BACKGROUND OF THE INVENTION

The present invention relates in general to apparatus for cleaning wires, and in particular to a wire cleaner using electric current to cathodically remove impurities from an elongated wire workpiece, such as welding wire.

Cathodic cleaning is commonly used to clean aluminum or superalloy workpieces prior to and during welding processes. In cathodic cleaning, an electric arc is established between the workpiece surface and an electrode, causing electrons to be emitted from the workpiece surface (i.e., the workpiece is the cathode, hence the name "cathodic" cleaning). The electron emission from the workpiece removes contaminants from the workpiece surface, thereby cleaning it of impurities. However, there are no known devices for continuously cathodically cleaning elongated lengths of welding wire prior to or during a welding process.

Magnetic fields are often used to affect an electric discharge, such as a welding arc, to cause the arc to rotate during a welding process. The welding arc is subjected to a stationary or moving, external magnetic field. One application of this method is the Magnetically Impelled Arc Butt (MIAB) welding process.

A cold sputter type of wire cleaner is disclosed in U.S. Pat. No. 4,935,115, in which a "long metal substrate" is continuously fed through a sputtering chamber vacuum, where a high electric potential between the substrate and an anode causes inert gas ions to bombard the substrate. The sputtering action of the inert gas ions cleans impurities from the wire; it does not form an arc to clean the wire. Because this device requires a vacuum to operate, long segments of wire must be fed through seals in the sputtering chamber to maintain the vacuum.

Other known wire cleaners use mechanical or chemical processes to clean welding wires. These processes are relatively time consuming, cumbersome, or inefficient. Common examples of the former processes include abrasive contact with the wire, while examples of the latter involve submersion of the wire in an acid or solvent bath to remove contaminants from the surface of the wire.

Applicant's earlier invention as set forth in U.S. patent application Ser. No. 08/706,124 filed Aug. 30, 1996 entitled DEVICE FOR CATHODIC CLEANING OF WIRE, will accomplish cathodic wire cleaning at wire feed rates in the range of 15 inches per minute (ipm). However, at the low electrical current levels employed therein, the electric arc established between the wire and the surrounding arc ring can sometimes become unstable.

It is thus clear that an apparatus which could provide faster high speed cleaning of welding and other wires just prior to use, and which would not require a vacuum environment or chemical solutions of acids or other solvents, would be welcomed by the industry.

SUMMARY OF THE INVENTION

It is a primary objective of the present invention to provide a new effective and relatively simple wire cleaner for removing impurities from the wire surface. Another objective of the present invention is to provide a wire cleaner which can rapidly and continuously clean a wire without allowing it to be re-contaminated.

The present invention is an improvement over that disclosed in Applicant's earlier invention set forth in U.S. patent application Ser. No. 08/706,124 filed Aug. 30, 1996 entitled DEVICE FOR CATHODIC CLEANING OF WIRE, and the text of that application is incorporated by reference as though fully set forth herein. Through a combination of enhancements to the basic principles employed in Applicant's earlier invention, an improved tandem cathodic cleaning device for wire is obtained which can clean wire at feed rates in excess of 200 ipm, and even at wire feed rates in a range of approximately 275–300 ipm. The ability to clean wire at these high wire feed rates enables the present invention to be useful for real-time wire cleaning during many production welding applications.

The device according to the invention cleans deposits from the surface of wire fed therethrough by establishing an electric arc discharge from the wire to an arc ring which carries off the impurities from the surface of the wire. Since the electric arc discharge occurs in the presence of a magnetic field established parallel to the wire, the electric arc discharge is forced to rotate around the circumference of the wire. The combination of wire movement through the device and arc rotation around the wire results in the electric arc discharge tracing a substantially helical (hereinafter, helical) cleaned path along the length of the wire.

At relatively slow wire feed rates, the pitch of the helical cleaned path is "tight" enough so that the entire wire surface is cleaned. However, as the wire feed rate is increased (other things being equal) the pitch of the helical cleaned path begins to "stretch out," increasing the likelihood that some of the wire is not cleaned by the electric arc discharge. In other words, a helical cleaned path would be produced alongside a helical uncleaned path, similar to the stripes on a barber pole.

To prevent this from occurring, the pitch of the helical cleaned path is "tightened" by increasing the strength of the magnetic field established parallel to the wire, thereby increasing the rate of rotation of the electric arc discharge around the circumference of the wire. Enhanced cleaning of the wire as it passes through the device is obtained by providing multiple sites for establishing the electric arc discharge. Further, to increase the stability of the electric arc discharge, changing how the cathodic wire cleaning device is powered produces a significant increase in arc stability and cleaning performance. Instead of using DC current, alternating current (AC) with a superimposed high frequency (HF) current is used.

These aspects are also embodied in a tandem cathodic cleaning device for wire wherein two arc rings are used to carry the current, so that two arcs are created in tandem. To increase the arc rotation speed, one of the ALNICO 5 magnets of the cathodic wire cleaning device of the prior application is replaced with a much stronger neodymium-iron-boron magnet located between the two arc rings, while two ALNICO 5 magnets are located on the opposite sides of each arc ring. Since the two arc rings provided share one magnet (the neodymium-iron-boron magnet located between them), only three magnets are required. A conventional Gas Tungsten Arc Welding (GTAW) power supply, connected so that one lead is connected to each of the arc rings, is provided. This power supply forces the current to arc from one arc ring to the wire, travel along the wire for a short distance (approximately 1.5 inches), and then arc from the wire to the second arc ring. The stronger magnetic field produced by this new magnet arrangement interacts with the arcs and causes them to rotate more rapidly, although the alternating arc currents will also cause the rotation direction itself to alternate rapidly. As a result, cathodic cleaning is always occurring at one of the arc rings (rapidly alternating between the two arc rings). The two electric arcs thus clean the wire twice during one pass through the tandem cathodic wire cleaning device, permitting great increases in wire feed rates while still producing acceptably clean wire.

Accordingly, one aspect of the present invention is drawn to a wire cleaner having a chamber and containing an annular arc ring for drawing a wire therethrough, such that when the wire and arc ring are provided with opposite potentials, an electric arc discharge occurs from the wire to the arc ring which carries off impurities from the surface of the wire. An inert gas is used to purge the chamber to prevent oxidation of the wire during and following the discharge from the wire. A pair of annular permanent magnets are positioned around the wire on each side of the arc ring to produce a magnetic field parallel to the wire. The magnetic field interacts with the electrical arc discharge and causes the arc to rotate around the circumference of the wire and arc ring, thereby cleaning the entire wire surface.

A second embodiment of the present invention replaces the pair of permanent magnets with a single, variable strength electromagnet surrounding the arc ring and wire path.

Another aspect of the present invention is drawn to a tandem cathodic wire cleaner for removing impurities from an elongated wire surface. The tandem wire cleaner comprises: an elongated housing having a first end and a second end. A pair of annular arc rings are provided, positioned between the first and second ends of the housing. Each annular arc ring has a first side, a second side opposite the first side, and a central hole through which the elongated wire travels as it is being cleaned. First annular permanent magnet means are disposed inbetween the first sides of the pair of annular arc rings, having a central aperture coaxially aligned with the central holes of each of the annular arc rings, and the pair of annular arc rings and the first annular permanent magnet means define a central arc chamber. Second annular permanent magnet means are disposed adjacent to the second sides of the pair of annular arc rings, the second annular permanent magnet means having central apertures coaxially aligned with the central holes of each of the annular arc rings, and the second annular permanent magnet means and the pair of annular arc rings together define first and second arc chambers adjacent to the second sides of the pair of annular arc rings. Means for guiding the elongated wire into the first end of the housing such that the wire passes through the first and second annular permanent magnet means and the pair of annular arc rings therebetween are also provided. Finally, means are provided for applying an electrical current to the pair of annular arc rings such that when the wire passes through the pair of annular arc rings, an electrical arc discharge occurs between the wire and each of the pair of annular arc rings. The arc discharge is forced to rotate around the wire by a magnetic field produced by the annular permanent magnet means, thereby cleaning the wire.

In another aspect of the invention, the tandem cathodic wire cleaner employs an additional internal wire guide to assist in wire alignment as it passes through the device to reduce the chance of the wire physically contacting either of the tandem arc rings. The additional internal wire guide is advantageously made of a heat resistant, non-conductive material such as a ceramic. To further enhance cooling of the wire and removal of contaminants cathodically removed from the wire, one or more apertures are provided in the internal wire guide for the passage of shielding gas therethrough.

The various features of novelty which characterize the invention are pointed out with particularity in the claims annexed to and forming a part of this disclosure. For a better understanding of the invention, its operating advantages and specific results attained by its uses, reference is made to the accompanying drawings and descriptive matter in which preferred embodiments of the invention are illustrated.

DETAILED DESCRIPTION OF THE PREFERRED EMBODIMENTS

Figure 1:
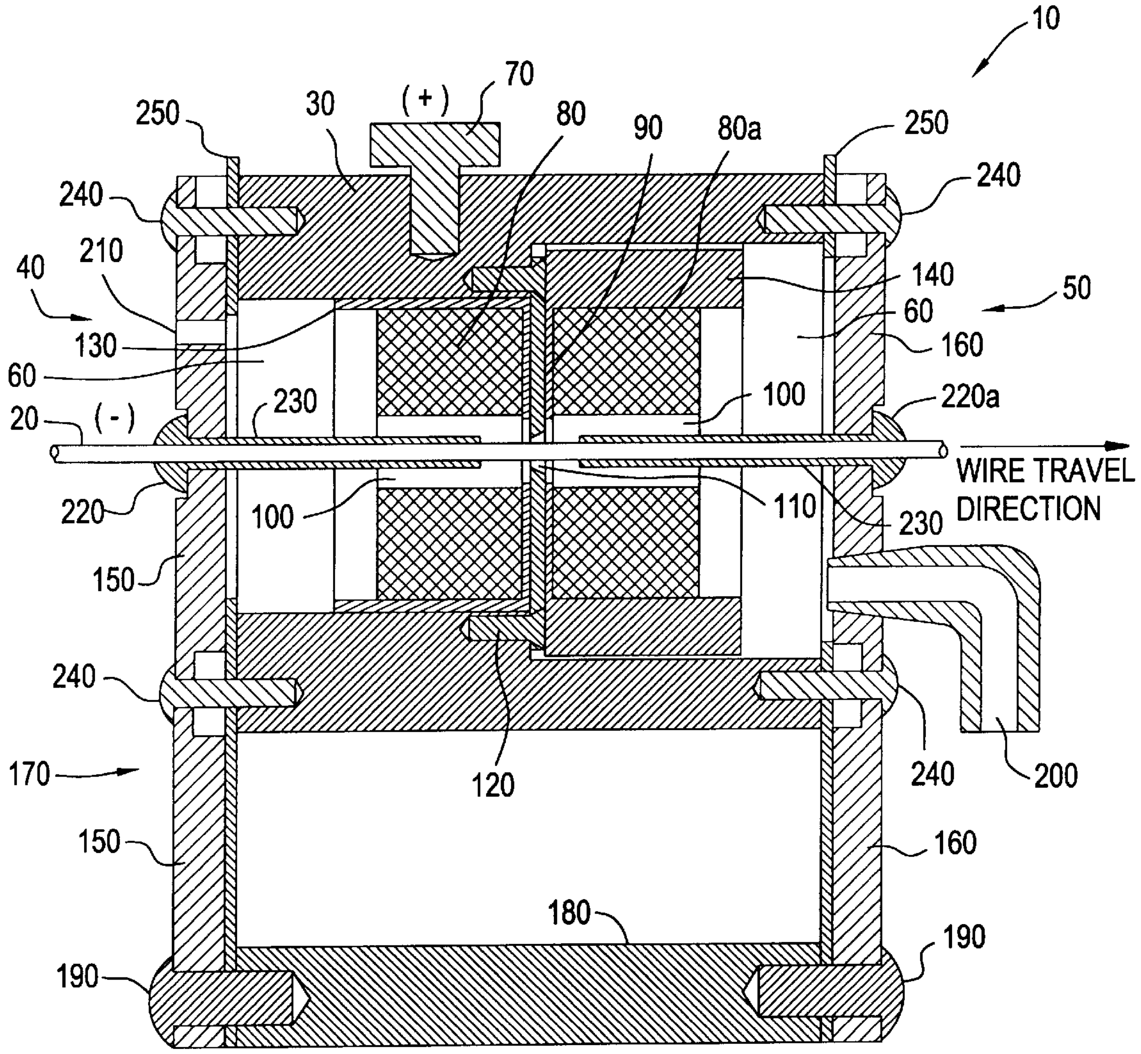
FIG. 1 is a sectional side elevation of a cathodic wire cleaner according to the invention.

Referring to the drawings generally, wherein like numerals designate the same or functionally similar elements throughout the several drawings, and to FIG. 1 in particular, there is shown a first embodiment of the wire cleaner of the present invention, generally designated 10. As shown in FIG. 1, wire cleaner 10 illustrates an elongated wire 20 extending therethrough and in position to be cleaned. The wire cleaner 10 has an elongated, substantially cylindrical, hollow housing 30 advantageously made of an electrically and thermally conductive material such as copper. Housing 30 has a first end 40 which would receive the elongated wire 20 via known feeding means (such as the wire feeding mechanism of a welding apparatus, not shown) and a second end 50 from which the elongated wire 20 exits once it has been cleaned. Housing 30 is hollow, and defines a central cleaning chamber 60. To provide a means for electrically connecting the housing 30 to a source of electrical current, an anode (+ with respect to electron current flow) connection, such as bolt or screw 70 is located on an exterior surface of the housing 30.

Permanent magnet means, 80, 80*a*, are provided, advantageously in the form of a pair of hollow annular permanent magnets. The pair of permanent magnets are advantageously made of ALNICO 5 material, their poles arranged in an N-S-N-S or S-N-S-N arrangement. An annular arc ring 90 advantageously made of copper, is located between permanent magnets 80, 80*a*, and the permanent magnets 80, 80*a* and annular arc ring 90 are all located within the central cleaning chamber 60. Each permanent magnet 80, 80*a* has a substantially cylindrical central aperture 100 through which the elongated wire 20 can pass; likewise, the copper annular arc ring 90 also has a substantially cylindrical hole 110, coaxially aligned with apertures 100, through which the elongated wire 20 passes. The diameter of the hole 110 is selected to be slightly larger than the diameter of the elongated wire 20 traveling therethrough so that the latter can pass through the hole 110 without touching annular arc ring 90. Copper annular arc ring 90 is electrically connected to housing 30 by being in direct contact therewith, and is advantageously secured thereto by one or more bolts or screws 120.

While the copper annular arc ring 90 is in direct, electrical communication with the housing 30, the permanent magnets 80, 80*a* are not. Instead, permanent magnet 80 is located within an electrically insulating cup 130, advantageously made of Teflon®, nylon, or similar material. Insulating cup 130 lines the outer circumference of the permanent magnet 80, and also separates the permanent magnet 80 from one face of the adjacent annular arc ring 90. Similarly, permanent magnet 80*a* is located within an electrically insulating cup 140, also advantageously made of Teflon, nylon, or similar material, which lines the outer circumference of the permanent magnet 80*a*, and also separates the permanent magnet 80*a* from the opposite face of the adjacent annular arc ring 90. The insulating cups 130, 140 preferably extend beyond the ends of permanent magnets 80, 80*a*, respectively, to prevent possible arcing between them and the housing 30. Similarly, the central apertures 100 in each of the permanent magnets 80, 80*a* are provided with a diameter large enough to prevent arcing between them and the wire guides, described infra.

Side covers 150, 160 are provided on each of the first and second ends 40, 50, respectively of the housing 30 and serve to close off the central cleaning chamber 60 from the outside environment. Side covers 150, 160 also extend beyond the outer surface of housing 30 at one side 170 and are connected to a base support plate 180, advantageously made of aluminum, which is positioned between the side covers 150, 160 and secured thereto by electrically conducting fasteners, such as steel screws or bolts 190. Side cover 160 is advantageously provided with an inert gas inlet 200 in fluidic communication with central cleaning chamber 60. The gas inlet 200 may advantageously be provided as a commercially available fitting for connecting to a source (not shown) of inert gas, such as argon. The other side cover 150 is correspondingly provided with an inert gas outlet 210, also in fluidic communication with central cleaning chamber 60, which provides an outlet for the inert gas and any contaminants contained therein which occur as a result of the cleaning of the elongated wire 20. It will be noted that the direction of travel of the elongated wire 20 and of the inert gas flow through the wire cleaner 10 have been shown in the drawings as being in opposite directions. This is preferred so that the inert gas flow can carry any contaminants removed from the wire 20 out of the wire cleaner 10 without recontaminating the cleaned elongated wire 20 exiting from the right hand side of FIG. 1.

Elongated wire 20 is provided into the central cleaning chamber 60 via a wire guide 220 having a central aperture 230 therein which is coaxially aligned with the central apertures 100 of permanent magnets 80, 80*a* and the hole 110 in annular arc ring 90. The wire guide 220 is mounted through and supported by side cover 150 located on the first side 40 of the wire cleaner 10 (on the left-hand side of FIG. 1), and through the central aperture 100 of permanent magnet 80 towards the annular arc ring 90. Wire guide 220 does not touch annular arc ring 80, however, and is spaced therefrom by a distance sufficient to prevent arcing therebetween. The elongated wire 20 passes through and is supported by the wire guide 220 for a portion of the length of the central aperture 100 of permanent magnet 80, and then is unsupported for a short distance until after it passes through the hole 110 in annular arc ring 90. After passing through the hole 110 in annular arc ring 90, the elongated wire 20 is still unsupported and does not make any physical contact with the structure of the wire cleaner 10 until it enters an end of a second wire guide 220*a* which is mounted through and supported by side cover 160 on the second side 50 of wire cleaner 10. Wire guide 220*a* also extends towards but does not touch the annular arc ring 90, and serves to guide and support the elongated wire 20 out of the wire cleaner 10 after the wire 20 has been cleaned. Both wire guides 220, 220*a* are advantageously made of a soft, electrically conductive material such as brass which would not cause any noticeable wear on the elongated wire 20 as it passes into and out of wire cleaner 10. In the embodiment of FIG. 1, side covers 150, 160 are also made of electrically conductive material, such as copper, but they are secured to the ends of the housing 30 in an electrically insulated fashion by virtue of insulating screw fasteners 240 (advantageously nylon) and insulating gasket materials 250 (advantageously Micarta or similar material).

During operation of the FIG. 1 embodiment, wire cleaner 10 is electrically connected to a welding power supply ground clamp (set as the negative lead, and not shown) at the base plate 180, or to either of side plates 150, 160. Since base plate 180 is also electrically connected to the wire guides 220, 220*a*, elongated wire 20 in physical contact therewith is also in electrical contact with side plates 150, 160. The wire 20 is thus the cathode (−) electrode. A welding power supply positive lead (not shown) is connected to the housing 30 at anode bolt 70. When the electrical connections are energized, electrons flow from the base plate 180 or side plates 150, 160 into wire guide 220 to the elongated wire 20, where an electric arc forms between the wire 20 and the annular arc ring 90. The gap between the annular arc ring 90 and the surface of the elongated wire 20 is preferably about 0.025 to 0.030 inches. After jumping the gap, the electrons subsequently travel from annular arc ring 90 through housing 30 to the positive lead at anode bolt 70.

While the arc is being generated, an inert gas, such as argon gas, is pumped into the cleaning chamber 60 through gas inlet 200 to continuously flush the cleaning chamber 60 of contaminants and to prevent the heated wire 20 surface from oxidizing. The inert gas also provides a good ionizing medium for the arc. The inert gas is exhausted through gas outlet 210. To stabilize the arc, the hole 110 in annular arc ring is preferably conical to present a sharp edge that will concentrate the arc between wire 20 and annular arc ring 90. The conical shaped hole 10 may be formed from only one side of annular ring 90, as shown, or a pair of conical holes could be provided, one from each side, to provide a sharp edge at the substantial midpoint of the thickness of annular arc ring 90. The edge may be a sharp, knife edge, or alternatively have a small flat surface forming the inner circumference of the hole 110; i.e., a chamfered or beveled surface.

The electric arc generated between the wire 20 and annular arc ring 90 is affected by the magnetic fields established by the permanent annular magnets 80, 80*a*. A portion of the magnetic field force lines are substantially parallel to the elongated wire 20 as it passes through the wire cleaner 10. The arc current crosses these magnetic force lines at substantially right angles, and results in a Lorentz force being exerted on the arc. The Lorentz force exerted on the arc causes the arc to circumferentially rotate around the wire 20.

The wire 20 may be drawn through the wire cleaner 10 at a rate sufficient to allow the magnetic field interaction to force the arc to fully rotate around a particular section of wire 20 before that section of the wire 20 is moved past the annular arc ring 90. The electrons forming the arc carry impurities off of the outer surface of the wire 20, leaving a clean, unabraded surface suitable for use in welding or other processes. The counterflowing inert gas flushes these impurities from the central cleaning chamber 60 so as not to recontaminate the cleaned wire 20.

Figure 2:
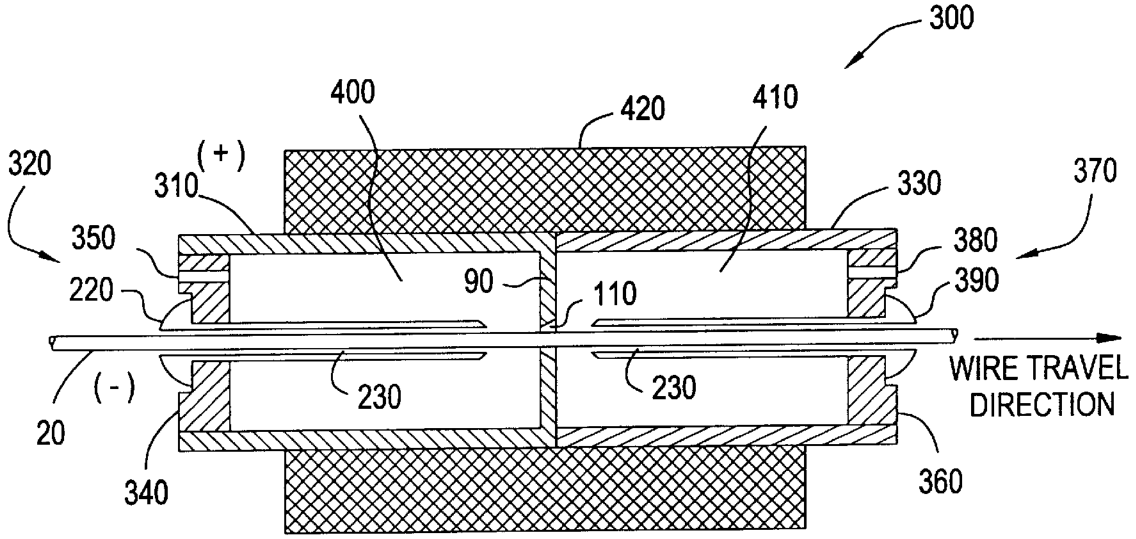
FIG. 2 is a sectional side elevation of another embodiment of the cathodic wire cleaner of the invention.

A second embodiment of the wire cleaner 5 is shown in FIG. 2. Again, functionally similar or identical components are indicated with like reference numerals. A first electrically conducting cylinder 310 having an integral annular arc ring 90 at a first end 320 is attached to a second thermally conductive cylinder 330. In contrast to the embodiment of FIG. 1, however, the electrically conducting cylinder 310 has a side cover 340 made of electrically insulating material which seals the first end opposite the integral arc ring 90. An electrically conductive wire guide 220 is again provided in side cover 340, along with an inert gas outlet 350.

The second thermally conductive cylinder 330 also has a side cover 360 made of electrically insulating material sealing a second end 370 opposite the connection to electrically conducting cylinder 310. Side cover 360 is also provided with an inert gas inlet 380, but the elongated wire 20 exits through an insulating (advantageously ceramic) wire guide 390. Thermally conductive cylinder 330 may be of any material which is a good heat conductor, while both side covers 340, 360 are also made of any electrical insulator.

Wire guides 220 and 390 support elongated wire 20 as it passes through central cleaning chambers 400, 410 defined by electrically conducting cylinder 310 and second thermally conductive cylinder 330, respectively, and their respective side covers 340 and 360. The electrically insulating, ceramic wire guide 390 prevents electric current flow in the wire within the outlet chamber 410 and prevents arcs or discharges from occurring in the outlet chamber 410. This minimizes heating of the wire 20 which could cause re-oxidation of the wire 20. During operation, the elongated wire 20 is maintained at a negative electrical potential, while the electrically conducting cylinder 310 and integral annular arc ring 90 are maintained at a positive potential. The elongated wire 20 passes through the hole 110 in annular arc ring 90 dividing chambers 400 and 410 from each other, causing an arc to form between the elongated wire 20 and integral annular arc ring 90 and clean the surface of the elongated wire 140. Dimensional relationships between the wire 20 diameter and hole 110 are maintained as before, along with other distances between components to prevent arcing at undesired locations.

As with the first embodiment, the chambers 400, 410 are continuously flushed in counterflow direction (410 first, then 400) with an inert gas such as argon during operation. As described above, the inert gas is provided at chamber 410 at gas inlet 380 and exhausted from chamber 400 at gas outlet 350.

In further contrast to the embodiment of FIG. 1, instead of permanent magnets 80, 80*a*, an electromagnet 420 surrounds the electrically conducting cylinder 310 and second thermally conductive cylinder 330. The strength of the magnetic field produced by electromagnet 420 may thus be varied to cause the Lorentz force produced during the interaction between the electrical arc and the magnetic field of the electromagnet 420 to be larger. The larger the Lorentz force, the faster the electrical arc will rotate around the wire 20, and the faster the wire 20 may be drawn through the wire cleaner 300 while still being cleaned.

In each embodiment, the length of the chambers 60, or 400, 410 may be varied to provide a longer or shorter period during which the elongated wire 20 may cool in the inert gas environment to inhibit oxidation of the cleaned surface. If the elongated wire 20 is withdrawn from chamber 60, or 410 too quickly, before the cleaned elongated wire 20 is allowed to cool to near room temperature, re-oxidation will occur when it is exposed to air.

Preferred values for the direct current (DC) voltage potential created between the elongated wire 20 and annular arc ring 90 are between about 5 and about 20 volts. A current of between about 10 and about 25 amps may be used, although both the voltage and current may be adjusted up or down to suit the particular needs of the wire 20 being cleaned, as long as an arc is formed between the wire 20 and annular arc ring 90. The inert gas flow rate may be between about 3 and about 15 cfh (cubic feet per hour—$ft^3/hr$), although other values are also acceptable.

Figure 3:
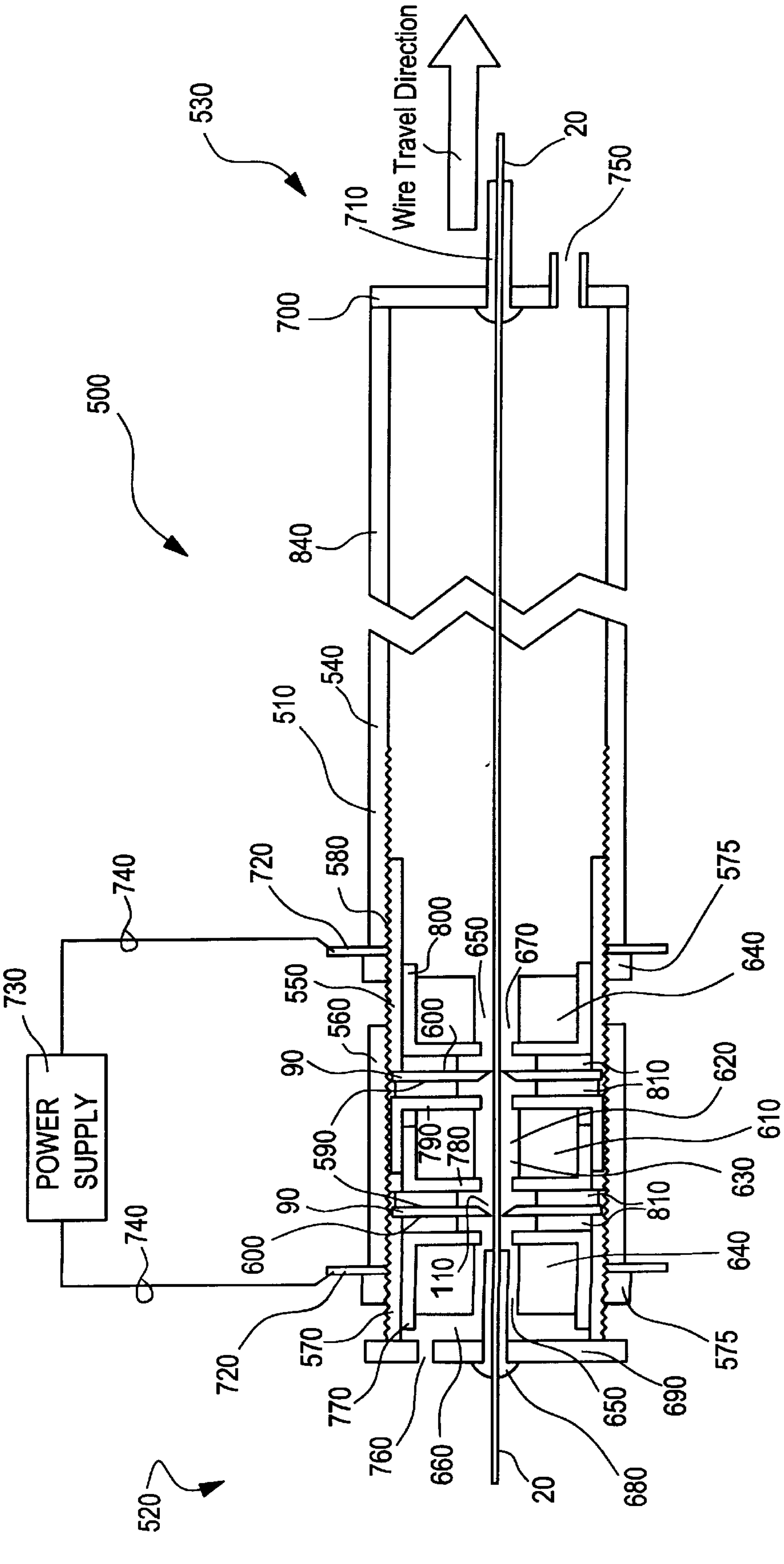
FIG. 3 is a sectional side elevation of another embodiment of the cathodic wire cleaner of the invention, this one employing a tandem arrangement of arc rings.
Figure 4:
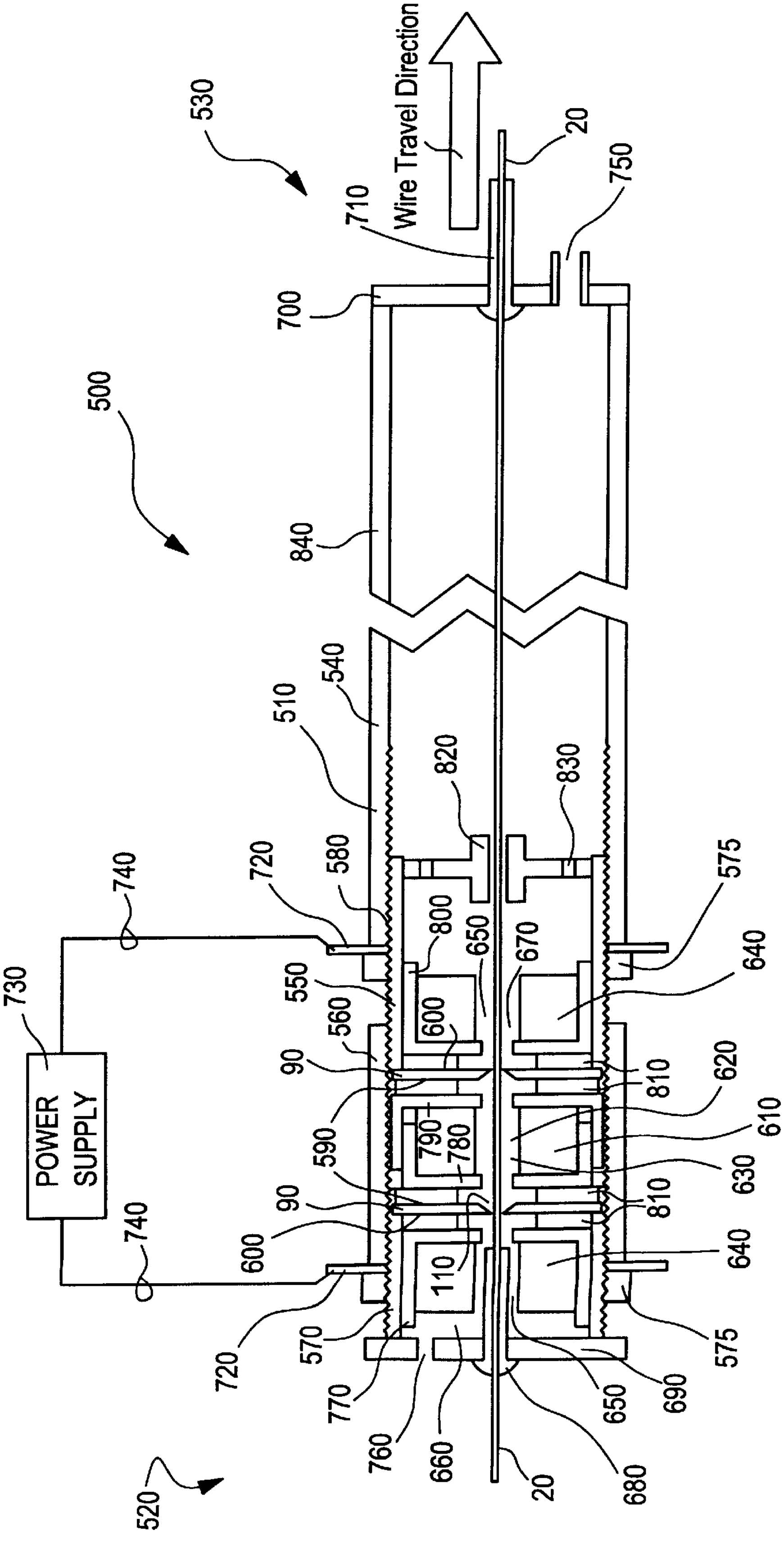
FIG. 4 is a sectional side elevation of another embodiment of the cathodic wire cleaner of the invention shown in FIG. 3, which incorporates an additional internal wire guide to provide enhanced wire alignment as the wire passes through the cathodic wire cleaner.

FIGS. 3 and 4 illustrate other embodiments of the present invention, generally referred to as tandem cathodic wire cleaner 500. As with the previous embodiments, tandem cathodic wire cleaner 500 removes impurities from the surface of an elongated wire 20. Laboratory tests have demonstrated that these embodiments can clean wire at feed rates in excess of 200 ipm, and even at wire feed rates in a range of approximately 275–300 ipm. These embodiments are thus suitable for real-time wire cleaning during many production welding applications.

Tandem cathodic wire cleaner 500 comprises an elongated housing 510 having a first end 520 and a second end 530. Advantageously, housing 510 is made of plural sections 540, 550, 560, 570 which are assembled together via lock nuts 575 and threaded connections such as at 580, thereby facilitating disassembly and/or replacement of components, such as the arc rings 90, as necessary. In FIGS. 3 and 4, elements 540, 550 and 570 would be electrically conductive, while element 560 is an insulating sleeve. In contrast to the earlier embodiments, a pair of annular arc rings 90 are provided, positioned between the first and second ends 520, 530 of the housing 510. Each annular arc ring 90 has a first side 590, a second side 600 opposite the first side 590, and a central hole 10 through which the elongated wire 20 travels as it is being cleaned by wire cleaner 500.

First annular permanent magnet means 610 are disposed inbetween the first sides 590 of the pair of annular arc rings 90, and this magnet means 610 has a central aperture 620 coaxially aligned with the central holes 10 of each of the annular arc rings 90. Together, the pair of annular arc rings 90 and the first annular permanent magnet means 610 define a central arc chamber 630.

Second annular permanent magnet means 640 are disposed adjacent to the second sides 600 of the pair of annular arc rings 90, outboard of the central arc chamber 630. The second annular permanent magnet means 640 also has central apertures 650 which are coaxially aligned with the central holes 110 of each of the annular arc rings 90. Together, the second annular permanent magnet means 640 and the pair of annular arc rings 90 define first 660 and second 670 arc chambers adjacent to the second sides 600 of the pair of annular arc rings 90. The first arc chamber 660 is located upstream (with respect to a direction of wire travel through wire cleaner 500) of the central arc chamber 630, while the second arc chamber 670 is located downstream of the central arc chamber 630. Means 680 are provided for guiding the elongated wire 20 into the first end 520 of the housing 510 such that the wire 20 passes through the first and second annular permanent magnet means 610, 640 and the pair of annular arc rings 90 therebetween. This inlet wire guide 680 means may advantageously comprise a bolt with a hole therein, and may be made of a material which would not cause significant wear on the elongated wire 20 as it passes through the inlet wire guide 680. As before, brass would be a suitable material. The inlet wire guide 680 is mounted on an inlet cover 690 made of electrically insulating material and attached on the first end 520 of the housing 510; a similar outlet cover 700 also made of electrically insulating material with an outlet wire guide means 710 would likewise be provided at the second end 530 of the housing 510.

Means 720 (preferably a conductive connector plate) are provided for applying an electrical current from a power supply 730 via electrical lines 740 to the pair of annular arc rings 90 such that when the wire 20 passes through the pair of annular arc rings 90, an electrical arc discharge occurs between the wire 20 and each of the pair of annular arc rings 90. As with the earlier embodiments, the arc discharge is forced to rotate around the wire 20 by a magnetic field produced by the annular permanent magnet means 610, 640, thereby cleaning the wire 20.

Means for purging the housing 510 with an inert gas, such as argon, are provided. The means advantageously comprise inlet 750 and outlet 760 shielding or purge gas connections, preferably arranged for counterflow (with respect to a direction of wire travel through the wire cleaner 500) of the inert gas, on the inlet and outlet covers 690, 700.

The first annular permanent magnet means 610 is preferably a single, neodymium-iron-boron magnet means. In contrast, the second annular permanent magnet means 640 comprises two separate magnets, preferably made of ALNICO 5 magnetic material.

Insulating means are provided to electrically isolate the annular permanent magnet means 610, 640 from both the housing 510 and the pair of annular arc rings 90. As illustrated in FIGS. 3 and 4, electrically insulating cups 770, 780, 790, 800 are provided for the magnets comprising the annular permanent magnet means 610, 640. Insulating spacers 810 are also provided to thermally and electrically isolate each of the pair of annular arc rings 90 from the annular permanent magnet means 610, 640. This is important because arcing to the annular permanent magnet means 610, 640 can cause them to become demagnetized. The insulating cups 770, 780, 790, 800 and spacers 810 would be made in an appropriate thickness, and of a suitable electrically insulating material (appropriate dielectric constant) which can withstand the temperatures in the vicinity of the annular arc rings 90.

It has been discovered that the use of alternating current (AC) with a superimposed high frequency (HF) current worked quite well to clean the wire 20 at very high wire feed speeds. Accordingly, the present invention contemplates that the power supply 730 comprises means for applying an alternating current (AC) with a superimposed high frequency (HF) current to the pair of annular arc rings 90 to stabilize the electrical arc discharge which occurs between the wire 20 and each of the pair of annular arc rings 90.

To assist in wire alignment as the wire 20 passes through the wire cleaner 500, thereby reducing the chance that the wire 20 will physically contact either of the annular arc rings 90, an additional internal wire guide 820, located adjacent to the second arc chamber 670, may be provided. This aspect is illustrated in FIG. 4. Internal wire guide 820 is advantageously made of a heat resistant, non-conductive material such as a ceramic. To further enhance cooling of the wire 20 and flushing of contaminants cathodically removed from the wire 20 from the interior chambers of the wire cleaner 500, one or more apertures 830 are preferably provided in the internal wire guide 820 for the passage of an inert gas such as argon therethrough.

It will thus be seen that the present invention cleans deposits from the surface of wire 20 fed therethrough by establishing an electric arc discharge from the wire 20 to one or more arc rings which carries off the impurities from the surface of the wire 20. Since the electric arc discharge occurs in the presence of a magnetic field established parallel to the wire 20, the electric arc discharge is forced to rotate around the circumference of the wire 20. The combination of wire movement through the wire cleaners of the invention and arc rotation around the wire 20 results in the electric arc discharge tracing a substantially helical cleaned path along the length of the wire 20.

At relatively slow wire feed rates, the pitch of the helical cleaned path is “tight” enough so that the entire wire surface is cleaned. However, as the wire feed rate is increased (other things being equal) the pitch of the helical cleaned path begins to “stretch out,” increasing the likelihood that some of the wire 20 is not cleaned by the electric arc discharge. In other words, a helical cleaned path would be produced alongside a helical uncleaned path, similar to the stripes on a barber pole.

To prevent this from occurring, the pitch of the helical cleaned path is “tightened” by increasing the strength of the magnetic field established parallel to the wire 20, thereby increasing the rate of rotation of the electric arc discharge around the circumference of the wire 20. Enhanced cleaning of the wire 20 as it passes through the wire cleaner is also obtained by providing multiple sites for establishing the electric arc discharge. Further, to increase the stability of the electric arc discharge, changing how the cathodic wire cleaner of the invention is powered produces a significant increase in arc stability and cleaning performance. Instead of using DC current, alternating current (AC) with a superimposed high frequency (HF) current is used. While superimposed HF currents are commonly used in practice for stabilizing arcs during AC welding, to the present inventor’s knowledge the use of that concept to stabilize an AC current applied to cathodically clean wire 20 as described herein is both novel and unobvious. AC current can be used with any of the embodiments of FIGS. 1–4.

Accordingly, these aspects are further embodied in the tandem cathodic wire cleaner 500 wherein two arc rings are used to carry the current, so that two arcs are created in tandem. To increase the arc rotation speed, one of the ALNICO 5 magnets of the cathodic wire cleaning device of the prior application is replaced with a much stronger neodymium-iron-boron magnet located between the two arc rings 90, while two ALNICO 5 magnets are located on the opposite sides of each arc ring 90. Since the two arc rings 90 provided share one magnet (the neodymium-iron-boron magnet located between them), only three magnets are required. A conventional Gas Tungsten Arc Welding (GTAW) power supply 730, or any power supply 730 capable of similar electrical output, is connected so that one lead is connected to each of the arc rings 90. This power supply 730 forces the current to arc from one arc ring 90 to the wire 20, travel along the wire 20 for a short distance (approximately 1.5 inches), and then arc from the wire 20 to the second arc ring 90. The stronger magnetic field produced by this new magnet arrangement interacts with the arcs and causes them to rotate more rapidly, although the alternating arc currents will also cause the rotation direction itself to alternate rapidly. As a result, cathodic cleaning is always occurring at one of the arc rings 90 (rapidly alternating between the two arc rings 90). The two electric arcs thus clean the wire twice during one pass through the tandem cathodic wire cleaner 500, permitting great increases in wire feed rates while still producing acceptably clean wire 20.

Tests with the wire cleaner 500 and using AC indicate that 100% of the wire 20 surface can be cleaned at 275 ipm and about 98% of the wire 20 can be cleaned at 300 ipm (limited during the tests by the wire feeder's maximum speed). The AC arc current was 10A, and a 10 cfh flow of argon gas was used for shielding. The superimposed high frequency (HF) waveform was run continuously, with a balanced waveform and the intensity set to 10. The HF is typically 10 to 100 kHz, and typically with a current in the milliamp range. A Miller Synchrowave 350 power supply was used in these tests. Of course other power supplies could be employed, and the amperage, HF, and argon (inert gas) flow rate settings would be adjusted to suit a given application.

The device and cleaning process of the present invention also reduces the wire cast (the curvature of the wire 20 which results from its being wound onto a spool), and thus represents another advantage of the invention. The reduction in wire cast is believed to be caused primarily by heating of the wire 20 (from the arc discharge itself, as well as by resistive heating of the wire 20) which partially stress relieved the wire 20. This effect enhances the ease by which the wire 20 is fed into the wire cleaner (as well as into a subsequent welding apparatus), and wear of other wire guiding parts in such downstream welding apparatus is reduced.

The tandem cathodic wire cleaner 500 of the present invention can clean wire, such as welding wire, at much faster rates than the prior art. Moderately oxidized, copper coated steel welding wire, as well as 308L stainless steel welding wire with drawing lubricant, has been successfully cleaned. It is also believed that the present invention can be used to remove the aluminum oxide from the surface of 4043 aluminum weld wire. The cleaning speeds obtained are sufficiently fast enough to make it practical to clean wire 20 in a real-time environment for use in subsequent applications. Since the electric current enters and leaves the wire 20 through an electric arc, there is no need for sliding electrical contacts to the wire 20, eliminating problems that might otherwise occur if sliding contacts were employed (e.g., wear, arcing at the contacts, variations in contact location and resistance, etc.). Cooling of the wire 20 before it exits the wire cleaner 500 is accomplished by the inert shielding gas, as well as by selecting a length of an outlet portion 840 of housing 510 to be sufficiently long. A test setup of the present invention used a wire cleaner 500 approximately 18" long overall; the extra length was added to portion 840, thereby extending the length of second arc chamber 670.

Further, while specific materials have been specified for certain elements of the invention, it should be noted that any known equivalent electrically conductive or insulating materials may be substituted for the indicated materials (as the case may be) described above. Thus, while specific embodiments of the invention have been shown and described in detail to illustrate the application of the principles of the invention, it will be understood that the invention may be embodied otherwise without departing from such principles.

I claim:

1. A tandem cathodic wire cleaner for removing impurities from an elongated wire surface, the wire cleaner comprising:

an elongated housing having a first end and a second end;

a pair of annular arc rings positioned between the first and second ends of the housing, each annular arc ring having a first side, a second side opposite the first side, and a central hole through which the elongated wire travels as it is being cleaned;

first annular permanent magnet means disposed inbetween the first sides of the pair of annular arc rings and having a central aperture coaxially aligned with the central holes of each of the annular arc rings, the pair of annular arc rings and the first annular permanent magnet means defining a central arc chamber;

second annular permanent magnet means disposed adjacent to the second sides of the pair of annular arc rings, the second annular permanent magnet means having central apertures coaxially aligned with the central holes of each of the annular arc rings, the second annular permanent magnet means and the pair of annular arc rings together defining first and second arc chambers adjacent to the second sides of the pair of annular arc rings;

means for guiding the elongated wire into the first end of the housing such that the wire passes through the first and second annular permanent magnet means and the pair of annular arc rings therebetween; and means for applying an electrical current to the pair of annular arc rings such that when the wire passes through the pair of annular arc rings, an electrical arc discharge occurs between the wire and each of the pair of annular arc rings, and the arc discharge is forced to rotate around the wire by a magnetic field produced by the annular permanent magnet means, thereby cleaning the wire.

2. The tandem cathodic wire cleaner according to claim 1, further comprising means for purging the housing with an inert gas.

3. The tandem cathodic wire cleaner according to claim 1, wherein the housing comprises plural sections which are assembled together.

4. The tandem cathodic wire cleaner according to claim 1, wherein the first annular permanent magnet means comprises neodymium-iron-boron magnet means.

5. The tandem cathodic wire cleaner according to claim 1, wherein the second annular permanent magnet means comprises two separate magnets.

6. The tandem cathodic wire cleaner according to claim 1, further comprising insulating means for electrically isolating the annular permanent magnet means from the housing and the pair of annular arc rings.

7. The tandem cathodic wire cleaner according to claim 1, wherein the electrical current applied to the pair of annular arc rings comprises an alternating current (AC) with a superimposed high frequency (HF) current to stabilize the electrical arc discharge which occurs between the wire and each of the pair of annular arc rings.

8. The tandem cathodic wire cleaner according to claim 1, further comprising internal wire guide means, located adjacent to the second arc chamber, for aligning the wire to reduce the chance that the wire will physically contact one of the annular arc rings.

* * * * *